US008306704B2

(12) United States Patent
Matsuyama

(10) Patent No.: US 8,306,704 B2
(45) Date of Patent: Nov. 6, 2012

(54) ENGINE CONTROL DEVICE FOR WORKING VEHICLE

(75) Inventor: Nobuo Matsuyama, Komatsu (JP)

(73) Assignee: Komatsu Ltd., Tokyo (JP)

( * ) Notice: Subject to any disclaimer, the term of this patent is extended or adjusted under 35 U.S.C. 154(b) by 403 days.

(21) Appl. No.: 12/093,488

(22) PCT Filed: Dec. 11, 2006

(86) PCT No.: PCT/JP2006/324665

§ 371 (c)(1),
(2), (4) Date: May 13, 2008

(87) PCT Pub. No.: WO2007/080731

PCT Pub. Date: Jul. 19, 2007

(65) Prior Publication Data

US 2009/0240404 A1 Sep. 24, 2009

(30) Foreign Application Priority Data

Jan. 10, 2006 (JP) ................................ 2006-002850

(51) Int. Cl.
*G06F 7/70* (2006.01)
*G05B 19/02* (2006.01)

(52) U.S. Cl. ................ 701/50; 701/82; 701/91; 37/414

(58) Field of Classification Search .................... 701/50, 701/84, 39, 30, 82, 91; 414/695.5, 15; 340/439, 340/425.5, 691.6; 702/182; 60/452, 420; 37/379, 414, 416

See application file for complete search history.

(56) References Cited

U.S. PATENT DOCUMENTS

| | | | | |
|---|---|---|---|---|
| 4,697,418 A | * | 10/1987 | Okabe et al. | 60/434 |
| 4,704,922 A | | 11/1987 | Suketomo et al. | |
| 4,726,186 A | * | 2/1988 | Tatsumi et al. | 60/434 |
| 4,886,123 A | * | 12/1989 | Winfried et al. | 172/7 |
| 5,560,431 A | | 10/1996 | Stratton | |
| 5,968,103 A | | 10/1999 | Rocke | |
| 6,272,415 B1 | | 8/2001 | Tanaka et al. | |
| 6,582,340 B1 | | 6/2003 | Arie et al. | |
| 6,879,899 B2 | | 4/2005 | Budde | |

FOREIGN PATENT DOCUMENTS

| | | | |
|---|---|---|---|
| DE | 19629542 | A1 | 1/1997 |
| DE | 19800185 | A1 | 7/1998 |
| DE | 10018994 | A1 | 12/2000 |
| DE | 10353259 | A1 | 7/2004 |
| DE | 10197080 | T5 | 5/2007 |
| EP | 0 539 589 | A1 | 5/1993 |
| JP | 02-283830 | A | 11/1990 |
| JP | 04-203430 | A | 7/1992 |
| JP | 05-106243 | A | 4/1993 |
| WO | WO-02/49896 | A1 | 6/2002 |

* cited by examiner

*Primary Examiner* — James Trammell
*Assistant Examiner* — Muhammad Shafi
(74) *Attorney, Agent, or Firm* — Global IP Counselors

(57) ABSTRACT

This engine control device of a self-propelled working vehicle is an engine control device of a self-propelled working vehicle that includes a working machine hydraulic pump for driving a working machine, and includes a vehicle velocity detection section configured and arranged to detect a vehicle velocity and a traction force control section. The traction force control section is configured to reduce the traction force by limiting the maximum throttle amount when the vehicle velocity is less than or equal to predetermined velocity based on the result detected by the vehicle velocity detection section.

6 Claims, 5 Drawing Sheets

(a)

| DISCHARGE PRESSURE (kg/cm²) | P1 (200) | P2 (250) | P3 (300) |
|---|---|---|---|
| MAXIMUM THROTTLE AMOUNT (%) | 78 | 67 | 57 |

(b)

ENGINE CONTROL DEVICE FOR WORKING VEHICLE

CROSS-REFERENCE TO RELATED APPLICATIONS

This U.S. National stage application claims priority under 35 U.S.C. §119(a) to Japanese Patent Application No. 2006-002850, filed in Japan on Jan. 10, 2006. The entire disclosure of Japanese Patent Application No. 2006-002850 is hereby incorporated herein by reference.

FIELD OF THE INVENTION

The present invention relates to an engine control device, especially to an engine control device of a self-propelled working vehicle including a working machine hydraulic pump for driving a working machine.

BACKGROUND ART

A wheel loader as a self-propelled working vehicle is configured to obtain the driving force for a carrier and the driving force for a working machine from a single engine. Specifically, the driving force for a carrier of the wheel loader is obtained by a so-called HST hydraulic traveling device, or is obtained through a torque converter. Also, a hydraulic cylinder for driving a front working machine is driven by a hydraulic pump that is driven by the engine.

In addition, generally speaking, the wheel loader is often used for simultaneously performing works such as traveling and loading. Therefore, it is important how the output of the engine should be distributed to the carrier's side and the working machine's side in a balanced manner.

In addition, it is important in the wheel loader to balance the traction force (i.e., the driving force for driving a traveling section) and the lift force for elevating the lift arm. For example, the traction force works as the anti-lift force when a work is performed that the wheel loader travels forward and loads sediment into a bucket and then the bucket is lifted by driving a lift arm. In other words, the traction force works in a direction that the lift force of the lift arm is brought back.

Therefore, as the traction force increases, the lift force is reduced. Accordingly, it becomes difficult to perform a work. In response to this, a work is performed with the conventional working vehicle, while the lift force is prevented from being reduced by regulating the traction force by the operator's accelerator manipulation.

On the other hand, too much lift force result in insufficient traction force, and a so-called thrusting performance of thrusting the bucket into sediment gets worse. Accordingly, the lift arm is elevated before sediment and the like into are loaded into the bucket, and thus workability gets worse.

In response to this, as described in the Japanese Patent Application Publication No. JP-A-H05-106243, a working vehicle is proposed that the engine speed is configured to be reduced until the work velocity of a front working machine reaches a predetermined value under the condition that the vehicle velocity is approximately zero and the driving pressure of a front working machine hydraulic cylinder is greater than or equal to a predetermined value. In the working vehicle described in the publication, the traveling torque is reduced when the large driving force for the front working machine is needed. Accordingly, it is possible to increase the lift force by the amount corresponding to the amount of the reduced traveling toque.

SUMMARY OF THE INVENTION

In the working vehicle described in the above publication, a condition that the vehicle velocity is reduced to approximately zero, the hydraulic pressure of the working machine hydraulic cylinder, and work velocity of the working machine, are detected respectively, and the engine speed is configured to be controlled based on the detected results.

As to the above described control performed in the conventional device, there are many control parameters, and it is also necessary to perform feedback control. Therefore, there is a problem that control tends to be complicated and lacks reliability. Also, engine control is performed by putting priority on the work velocity of the working machine. Therefore, balance between the traction force and the lift force is worse than the balance regulated by the expert operator's accelerator operation. Because of this, there is a problem that operator's intended balance between the traction force and the lift force is not achieved.

It is an object of the present invention to achieve appropriate balance between the traction force and the lift force with simple control and further enhance workability.

An engine control device of a self-propelled working vehicle of a first invention is an engine control device of a self-propelled working vehicle that includes a working machine hydraulic pump for driving a working machine, and includes a vehicle velocity detection section configured and arranged to detect a vehicle velocity and a traction force control section. The traction force control section is configured to reduce the traction force by limiting a maximum throttle amount when the vehicle velocity is less than or equal to predetermined velocity based on a result detected by the vehicle velocity detection section.

In this device, vehicle velocity of the working vehicle is detected, and the maximum throttle amount is limited to a predetermined value when the vehicle velocity is less than or equal to a predetermined velocity. Therefore, when a work is performed at the vehicle velocity less than or equal to a predetermined velocity, the output of the engine is limited even when an operator further presses the accelerator pedal down, for instance. Accordingly, the traction force is reduced compared to a case without limitation of the engine output, and it is possible to increase the lift force.

Here, it is possible to reduce the traction force and increase the lift force only by detecting the vehicle velocity and limiting the maximum throttle amount depending on the detected result, and thereby a quite simple configuration for control is provided. Accordingly, high reliability is achieved.

An engine control device of a self-propelled working vehicle of a second invention is the device of the first invention, and further includes a pump discharge pressure detection section configured and arranged to detect a discharge pressure of the working machine hydraulic pump. In addition, the traction force control section is configured to reduce the traction force by controlling the maximum throttle amount depending on the pump discharge pressure in addition to the vehicle velocity.

Here, when it is necessary to obtain the traction force during a work in the conventional working vehicle, the traction force is configured to be obtained when an operator stops operation of the working machine. On the other hand, as to the device described in the above conventional publication, the hydraulic pressure of the working machine hydraulic cylinder is not changed even when the work of the working machine is stopped. Therefore, the engine rotation is continuously controlled, and it is impossible to obtain the traction force.

Compared to this, according to the device of the present invention, the discharge pressure of the working machine hydraulic pump is reduced when the operation of the working machine is stopped. Therefore, the maximum throttle amount is controlled depending on the reduction. Also, on the contrary, the discharge pressure of the working machine hydraulic pump is increased when the working machine is operated. The maximum throttle amount is controlled depending on the increase. Accordingly, it is possible to perform a processing, which is similar to the conventional balance regulation by the operator's manipulation, with the automatic control.

An engine control device of an self-propelled working vehicle of a third invention is the device of the first invention or the second invention, and the working vehicle is allowed to switch an engine mode between a power mode for using an engine at high horsepower with emphasis on workability and an economy mode for using the engine at low horsepower with emphasis on reduction of fuel consumption rate. The engine control device further includes an engine mode determining section configured to determine whether the engine mode is set to be the power mode or the economy mode. In addition, the traction force control section configured to reduce the traction force by controlling the maximum throttle amount only when the engine mode is set to be the power mode.

Here, when the engine mode is set to be the power mode, the traction force may be increased too much. In addition to this, the engine mode is set to be the power mode when the large lift force is intended to be achieved. In response to this, the traction force control is performed only on the power mode in which the working machine needs to be powered more and the traction force is increased too much. Therefore, it is possible to perform effective engine control only when necessary.

An engine control device of a self-propelled working vehicle of a fourth invention is the device of the third invention, and the working vehicle includes a transmission with a plurality of speed change gears. In addition, the traction force control section is configured to reduce the traction force by controlling the maximum throttle amount only when the engine mode is set to be the power mode and the speed change gear is set to be a first forward gear.

Here, in the similar way to the above, the traction force is often increased too much when the speed change gear is set to be the first forward gear. In addition, the first gear on the power mode is selected when a heavy load work is performed. Therefore, the traction force control is performed only at the first gear on the power mode as described above. Accordingly, in the similar way to the above, it is possible to perform effective engine control only when necessary.

An engine control device of an self-propelled working vehicle of a fifth invention is the device of one of the first to fourth inventions, and the working vehicle includes a work mode selection section configured to select one of a plurality of work modes set in advance in accordance with a type of the working machine. Here, the work modes include at least a first work mode and a second work mode. In addition, the traction force control section is configured to reduce the traction force by setting a maximum throttle amount when the first work mode is selected to be lower than a maximum throttle amount when the second work mode is selected.

For example, when a tooth mode, on which a work is performed while a bucket having a plurality of teeth on the frontal tip thereof is mounted to the vehicle, is set as the first work mode, the larger lift force is generally needed for the tooth mode, compared to the other modes excluding the tooth mode. In response to this, according to the present invention, when the first work mode is selected as the work mode, the maximum throttle amount is limited to be lower than the maximum throttle amount when the other second work mode is selected.

Here, when the first work mode is selected, the maximum throttle amount is further limited and reduction level of the traction force is greater than that on the other modes. Therefore, it is possible to further increase the lift force and thus workability is enhanced.

An engine control device of an self-propelled working vehicle of a sixth invention is the device of one of the first to fourth inventions, and the working vehicle includes a work mode selection section configured to select one of a plurality of work modes set in advance depending on a type of the working machine. In addition, the traction force control section is configured to reduce the traction force by controlling the maximum throttle amount only when a specific work mode is selected by the work mode selection section.

Here, a plurality of work modes is set depending on the type of the working machine. When a specific work mode such as a heavy load work in a quarry and the like is selected from the plurality of the work modes, the large lift force may be needed because heavy load acts on the working machine. In response to this, according to the present invention, control for reducing the maximum throttle amount is performed only when a specific work mode is selected as the work mode. Accordingly, workability is enhanced.

An engine control device of an self-propelled working vehicle of a seventh invention is the device of the sixth invention, and the specific work mode includes at least a first work mode and a second work mode, and the traction force control section is configured to reduce the traction force by setting a maximum throttle amount when the first work mode is selected to be lower than a maximum throttle amount when the second work mode is selected.

In this case, in the similar way to the device of the sixth invention, it is possible to achieve larger traction force by reducing the maximum throttle amount to be a small value only when the large traction force is needed.

DETAIL DESCRIPTION OF PREFERRED EMBODIMENTS

Overall Configuration

Figure 1:
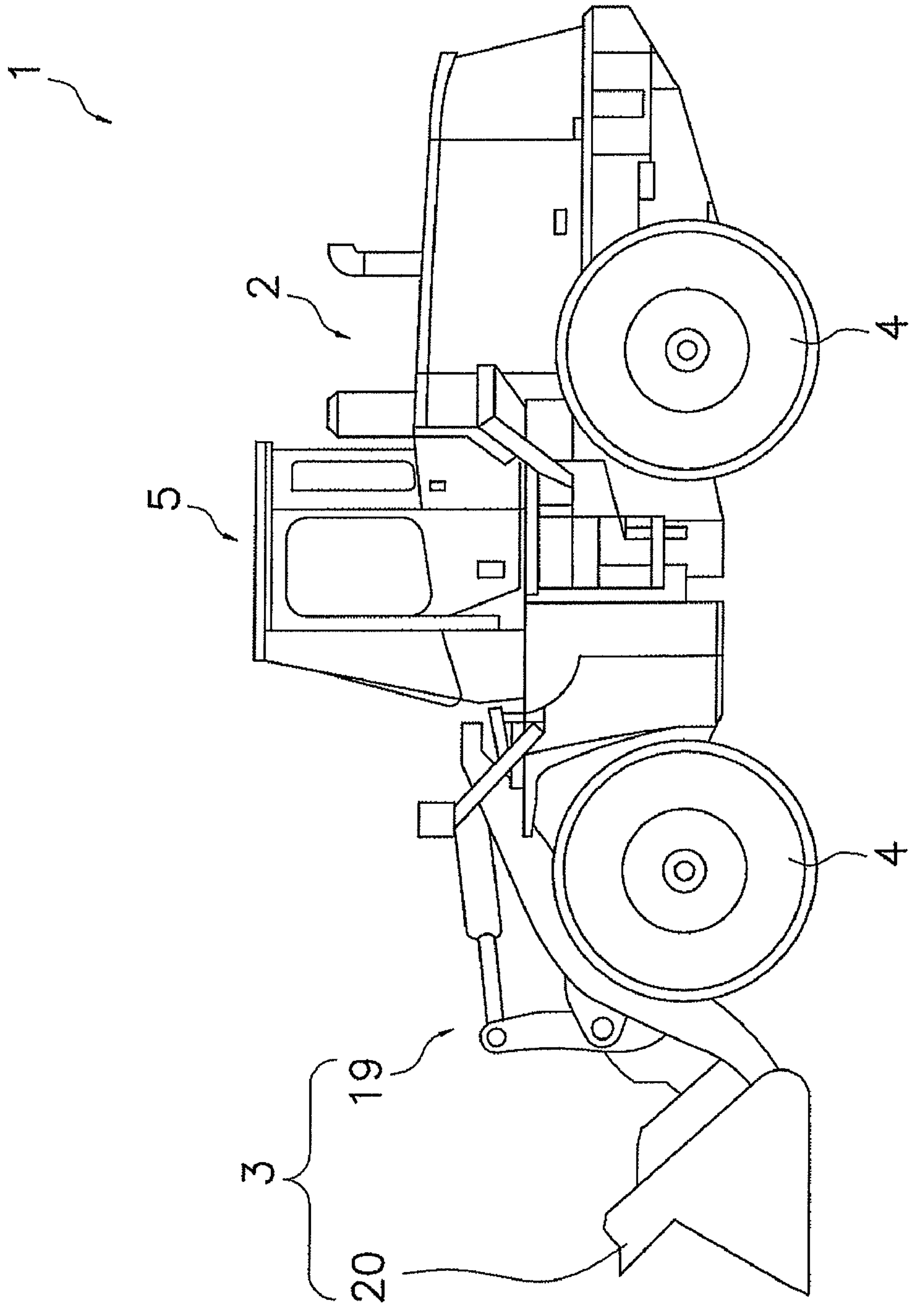
FIG. 1 is an external view of a wheel loader.
Figure 2:
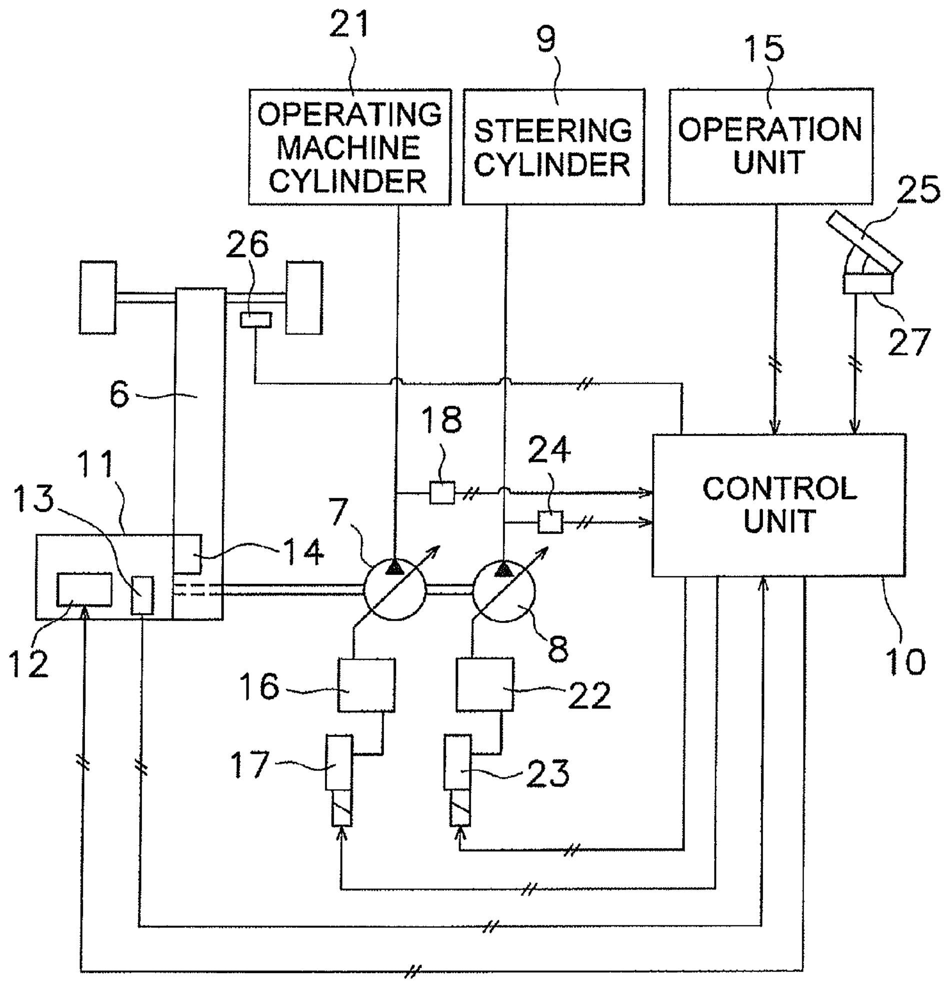
FIG. 2 is a diagram illustrating a control circuit of the wheel loader.

FIG. 1 illustrates a wheel loader 1 of an embodiment of the present invention. The wheel loader 1 includes a vehicle body 2, a working machine 3 attached to the front part of the vehicle body 2, four tires 4 that case the vehicle body 2 to travel by their rotation while they support the vehicle body 2, and a working room 5 mounted on the top of the vehicle body 2. In addition, as illustrated in FIG. 2, the vehicle body 2 is provided with an engine 11, a transmission 6, a working machine hydraulic pump 7, a steering hydraulic pump 8, a steering cylinder 9, a control unit 10, and the like. Output torque generated in the engine 11 is distributed to the transmission 6, the working machine hydraulic pump 7, the steering hydraulic pump 8, and the like, and thus the output torque works for driving the working machine 3 and/or works as the driving force during traveling. Note that FIG. 1 is an external lateral view of the wheel loader 1, and FIG. 2 is a schematic diagram for illustrating a configuration of a hydraulic circuit and a control system of the wheel loader 1.

The engine 11 is a diesel engine, and a fuel injection device 12 for controlling the output torque and rotation speed of the engine 11 is attached to the engine 11. In addition, the engine 11 is provided with an engine speed detection unit 13 that is made up of a rotation sensor for detecting the actual rotation speed of the engine 11. A rotation speed signal outputted from the engine speed detection unit 13 is inputted into the control unit 10.

The transmission 6 for traveling, which includes a torque converter 14, is coupled to an output shaft of the engine 11, and the driving force generated by the engine 11 is transmitted to the tires 4 through the transmission 6. The transmission 6 is configured to be capable of switching the speed reduction ratio into a plurality of phases ranging from high speed to low speed.

The working machine hydraulic pump 7 is a capacity variable type hydraulic pump that is driven by the output of the engine 11. The working machine hydraulic pump 7 is provided with a regulator 16 for regulating the tilt rotation angle of a swash plate of the working machine hydraulic pump 7 by making use of the pressured oil to be discharged from the working machine hydraulic pump 7, and an electromagnetic control valve 17 for controlling the regulator 16 based on a control current from the control unit 10. In addition, a pressure sensor 18 for detecting the discharge pressure of the working machine hydraulic pump 7 is provided, and a pump discharge pressure signal from the pressure sensor 18 is inputted into the control unit 10.

The working machine 3 is a unit that is driven by the pressured oil to be discharged from the working machine hydraulic pump 7. The working machine 3 includes a lift arm 19 that is mounted to the front part of the vehicle body 2, a bucket 20 that is attached to the tip of the lift arm 19, and a working machine cylinder 21. The lift arm 19 is an arm member for lifting up the bucket 20 that is attached to its tip. The bucket 20 is attached to the tip of the lift arm 19. The working machine cylinder 21 is a hydraulic actuator for driving the lift arm 19 and the bucket 20 with the pressured oil to be discharged from the working machine hydraulic pump 7. Note that a tooth mode is prepared for the wheel loader as a work mode. The tooth mode is a mode for mainly performing a heavy load work in a quarry and the like with the bucket 20 that a plurality of teeth are provided to the tip thereof.

The steering hydraulic pump 8 is a capacity variable type hydraulic pump that is driven by the output of the engine 11. The steering hydraulic pump 8 is provided with a regulator 22 for regulating the tilt rotation angle of a swash plate of the steering hydraulic pump 8 by making use of the pressured oil to be discharged from the steering hydraulic pump 8, and an electromagnetic control valve 23 for controlling the regulator 22 based on a control current from the control unit 10. The steering cylinder 9 is driven by the pressured oil to be discharged from the steering hydraulic pump 8, and changes the moving direction during traveling. In addition, a pressure sensor 24 for detecting the discharge pressure of the steering hydraulic pump 8 is provided, and a pump discharge pressure signal from the pressure sensor 24 is inputted into the control unit 10.

The working room 5 is disposed on a part of the vehicle body 2, which is positioned slightly ahead of the center part of the vehicle body 2. The working room 5 is provided with an accelerator pedal 25 that is manipulated by an operator, an operation unit 15, a display unit for displaying a variety of information, and the like.

The accelerator pedal 25 is means for instructing the target rotation speed of the engine 11, and an accelerator opening degree detection unit 27, which is made up of a potentiometer for detecting the opening degree of the accelerator pedal 25, and the like, is coupled to the accelerator pedal 25. An opening signal for indicating the opening degree of the accelerator pedal 25 is transmitted from the accelerator opening degree detection unit 27 to the control unit 10, and a control signal is outputted from the control unit 10 to the fuel injection device 12. In addition, a vehicle velocity sensor 26 (an example of a vehicle velocity detection section) for detecting vehicle velocity is provided on the output side of the transmission 6. A signal from the vehicle velocity sensor 26 is inputted into the control unit 10.

The operation unit 15 includes an operation panel on which a steering, an operation lever, and am operation button (these are not illustrated in the figure) and the like. The operation unit 15 is operated by an operator for the purpose of changing the moving direction of the wheel loader 1, switching between a power mode and an economy mode, switching into the tooth mode, selecting the speed reduction ratio of the transmission 6, and the like. Thus, in this embodiment, the operation unit 15 constitutes an example of a work mode selection section. The power mode is a work mode to be selected when workability is emphasized compared to fuel consumption rate, and is configured to have the engine output greater than that on the economy mode. The economy mode is a work mode in which workability is inferior to the power mode but the fuel consumption rate is superior to the power mode, and is configured to have the engine output that is reduced to be less than that on the power mode.

The control unit 10 has a variety of functions as an engine controller section for controlling the engine, a hydraulic pump controller section for controlling the working machine hydraulic pump, and the like. The control unit 10 is a unit for performing driving operation of the wheel loader 1, that is, a unit for controlling a variety of units such as the engine and the working machine. For example, the control unit 10 has functions for controlling the fuel injection amount of the fuel injection device 12 based on the opening degree of the accelerator pedal 25 and the actual rotation speed of the engine 11, and for controlling the traction force depending on the vehicle velocity, the discharge pressure of the working machine hydraulic pump 7, and the like.

Control Processing

A processing performed by the control unit 10 will be hereinafter explained with focusing on the balance control between the lift force and the traction force.

Lift Force and Traction Force

First, relation between the lift force and the traction force will be explained with reference to FIG. 3.

Figure 3:
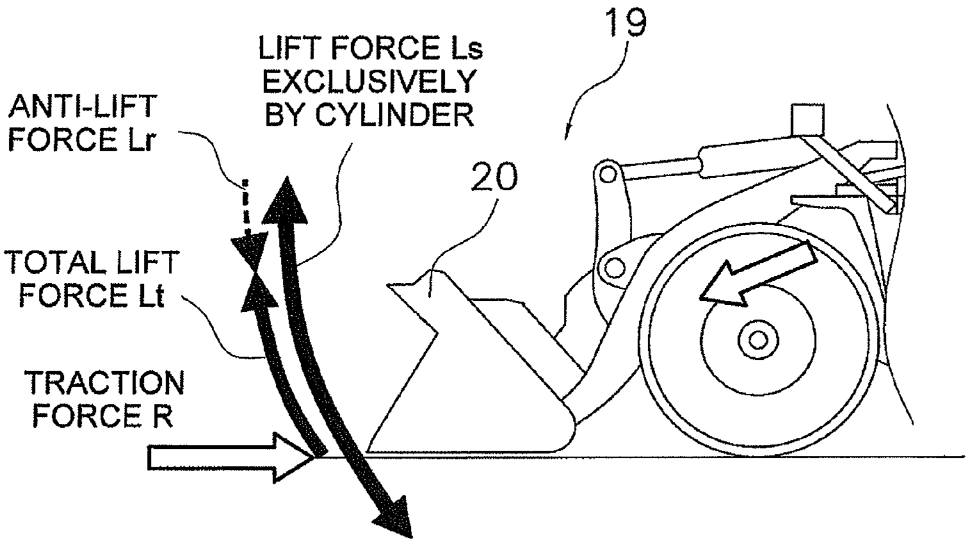
FIG. 3 is a diagram for illustrating relation between traction force and lift force.

As illustrated in FIG. 3, the lift arm 19 is moved up and down by the working machine cylinder 21. Here, when the lift force, which is exclusively generated by the working machine cylinder 21, is defined as the lift force Ls, resistance is supposed to be applied to the lift force Ls by the traction force R. In other words, the traction force R works as the anti-lift force Lr when a work is performed that the wheel loader travels forward and loads sediment into the bucket 20 and then the bucket 20 is lifted by the driving of the lift arm 19, for instance. Accordingly, the total lift force Lt is defined as "Lt=Ls−Lr". Therefore, when a large lift force is needed in a heavy load work, it is necessary to reduce the traction force.

Figure 4:
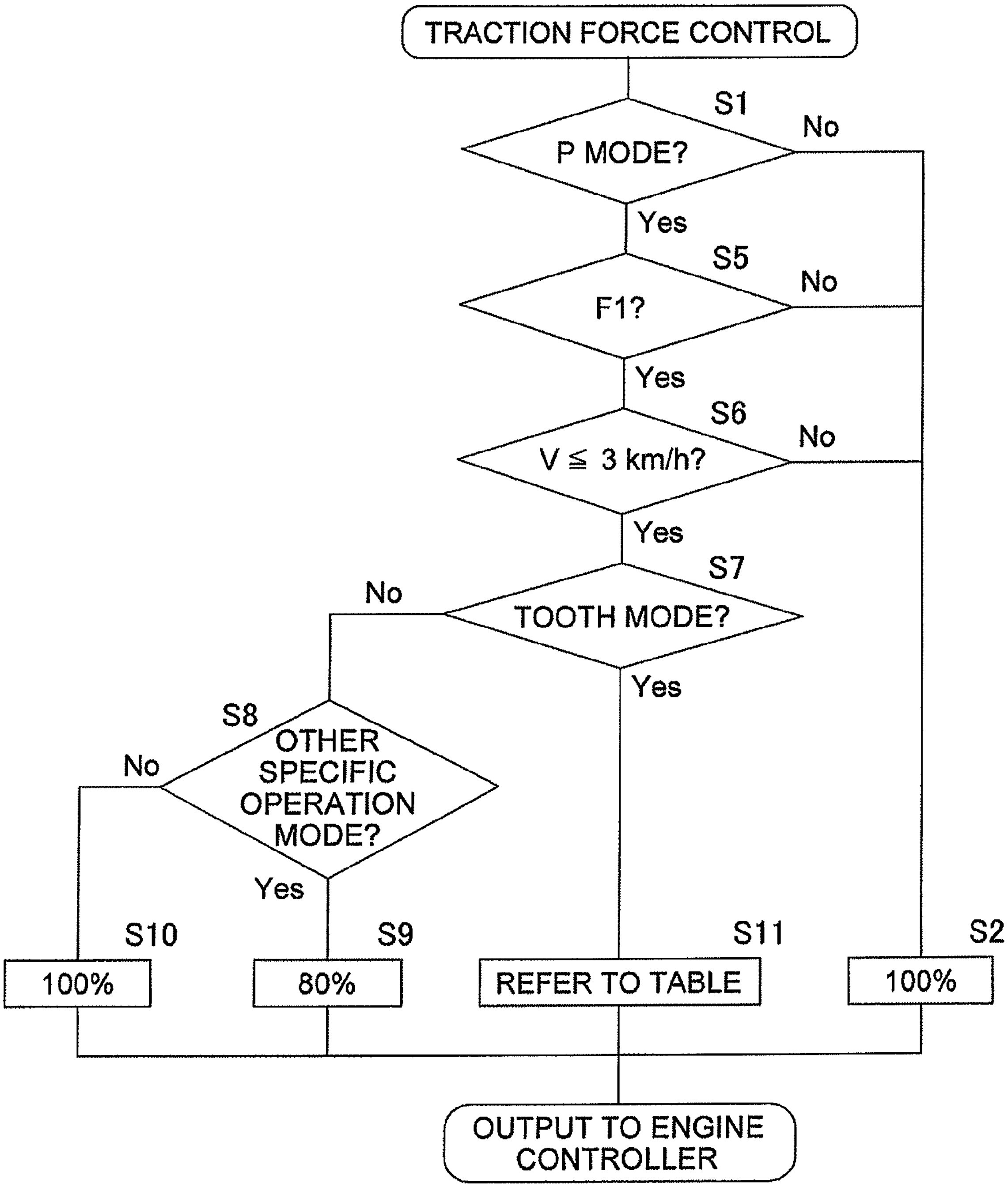
FIG. 4 is a flowchart of engine control.

In response to this, the wheel loader of the present embodiment performs control for reducing the traction force in accordance with a flowchart illustrated in FIG. 4, for instance.

Traction Force Control

First, it is determined in Step S whether the engine is set to be the power mode. Thus, in this embodiment, the control unit 10 constitutes an example of an engine mode determining section. Here, the power mode and the economy mode will be simply explained. As described above, the wheel loader 1 is configured to be allowed to select the power mode with emphasis on workability and the economy mode with emphasis on the fuel consumption rate by the operator's manipulation of the operation unit 15.

Power Mode and Economy Mode

Figure 5:
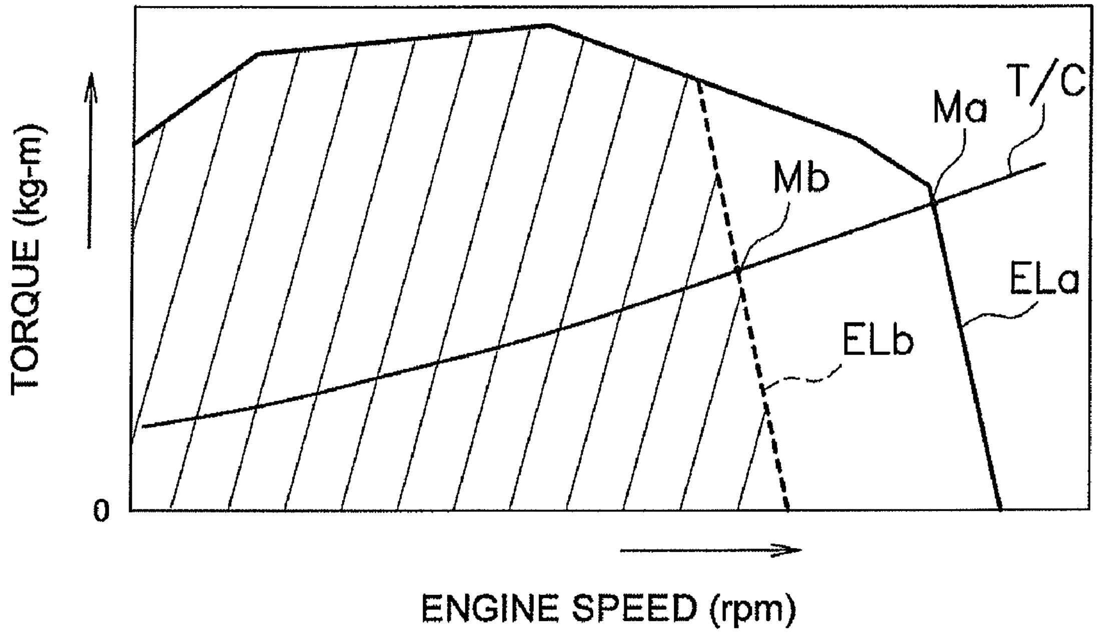
FIG. 5 is a diagram for illustrating engine torque performance on a power mode and an economy mode.

When the power mode is selected, an engine output torque property is set, which is illustrated with an engine output torque line ELa in FIG. 5. In addition, an absorption torque property is set, which is illustrated with an absorption torque line T/C. The absorption torque is sum of the absorption torque of the torque converter and the absorption torque of the working machine hydraulic pump, and is determined by traveling condition, working load, regulation of the amount of oil discharged from the working machine hydraulic pump, and the like. In FIG. 5, the absorption torque line T/C is a monotonically increasing function with a variable of the engine speed. In addition, in this case, it is possible to perform a heavy load work highly-efficiently when the output torque and the absorption torque of the engine 11 are matched in a matching point Ma and the hydraulic pump absorbs the engine output in the matching point Ma, that is, the maximum horsepower of the engine 1.

On the other hand, when the economy mode is selected, an engine output torque property is set, which is illustrated with an engine output torque line ELb. Then, the output torque and the absorption torque of the engine 11 are matched in a matching point Mb. As described above, the economy mode is configured that the output torque and the absorption torque of the engine 11 are allowed to be matched in the matching point Mb with the fuel consumption rate that is lower than that in the matching point Ma on the power mode. Thus it is possible to use the engine 11 in an area with good fuel-efficiency, and accordingly it is possible to enhance the fuel consumption rate.

When the economy mode is selected, a processing step is moved from Step S1 to Step S2, and the maximum throttle amount is set to be 100%. In other words, the traction force is not reduced without limiting the maximum throttle amount. This is because originally the traction force is not too large and resistance with respect to the lift force is small when traveling and work are performed on the economy mode. This is also because in general, the large lift force is not needed when traveling and work are performed on the economy mode.

On the other hand, when the power mode is selected, the processing step is moved from Step S1 to Step S5. It is determined in Step S5 whether the speed change gear of the transmission is set to be the first forward gear.

Control by Speed Change Gear

If the speed change gear is not set to be the first forward gear, the processing step is moved from Step S5 to Step S2, and the maximum throttle amount is set to be 100% in the similar way to the above. Consequently, when the first gear is set on the power mode, excessive traction force tends to be generated. When excessive traction force is thus generated, the drag force of the lift force becomes relatively large, and accordingly workability is reduced. Also, when a heavy load work is performed, the speed change gear of the transmission is generally changed to be the first gear and the large traction force is needed. However, when other types of works are performed, the traction force to be generated is not too large and the drag force of the lift force is small. Therefore, the maximum throttle amount is not limited.

Control by Vehicle Velocity

When the speed change gear of the transmission is set to be the first forward gear, the processing step is moved from Step S5 to Step S6. It is determined in Step S6 whether the vehicle velocity is less than or equal to 3 km/h based on a signal from the vehicle sensor 26. Note that in this embodiment, the traction force is controlled based on the determination whether the vehicle velocity is less than or equal to 3 km/h, and appropriate value is selected depending on type of vehicle.

If the vehicle velocity exceeds 3 km/h, the processing step is moved from Step S6 to Step S2, and the maximum throttle amount is set to be 100%. In other words, a heavy load work is generally performed at the low speed. Therefore, when the vehicle velocity is not low, it is determined that a heavy load work is not performed. Accordingly, a control processing for reducing the traction force is not performed.

If the vehicle velocity is less than or equal to 3 km/h, the processing step is moved from Step S6 to Step S7. It is determined in Step S7 whether the work mode is set to be the tooth mode (first work mode). Whether the work mode is set to be the tooth mode is determined based on the determination whether a changeover switch on an operation panel, which is used for switching the work mode into the tooth mode, is manipulated.

Control by Work Mode

Figure 6:
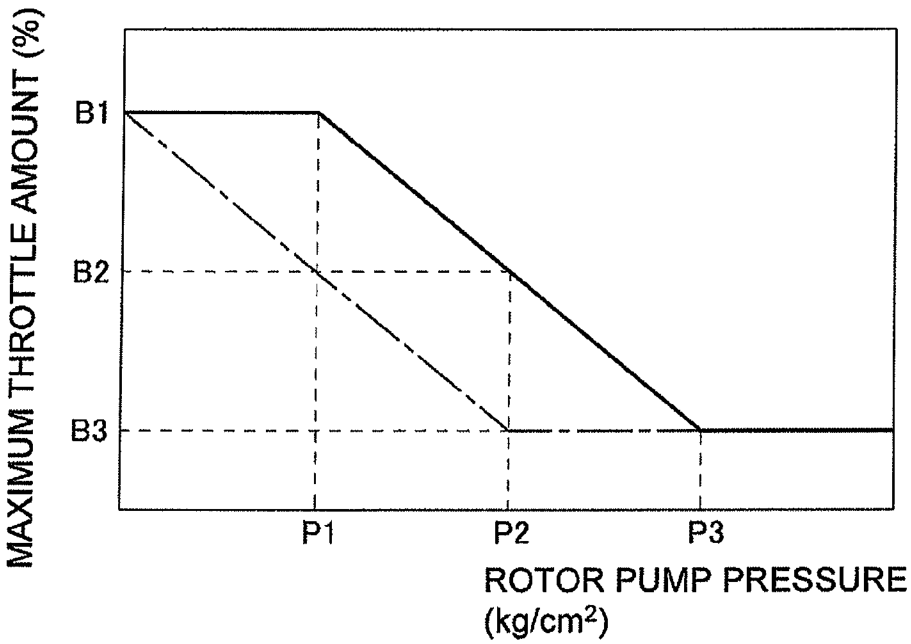
FIG. 6 includes diagrams for illustrating relation between discharge pressure of a working machine hydraulic pump and maximum throttle amount.

When the work mode is not set to be the tooth mode, the processing step is moved from Step S7 to Step S8. It is determined in Step S8 whether the work mode is set to be the other specific work mode (second work mode). The specific work mode herein is the mode on which the load to be applied is not heavier than that on the tooth mode but the lift force is needed. When this work mode is selected, the processing step is moved from Step S8 to Step S9, and the maximum throttle amount is set to be 80%. Note that the maximum throttle amount is set to be 80% in Step S9, but as illustrated in FIG. 6 to be described, the maximum throttle amount may be configured to be controlled to be in the range of 78-100% (not including 78% and 100%) depending on the discharge pressure of the working machine hydraulic pump 7 with a table.

Accordingly, even when an operator presses the accelerator pedal completely down, the maximum throttle amount is limited to 80% of the normal state (100%). Therefore, the traction force is reduced, and it is possible to increase the lift force by the amount corresponding to the reduced amount of the traction force.

On the other hand, if the power mode is selected and the speed change gear is set to be the first forward gear of low velocity and the work mode is not set to be the tooth mode, and furthermore if the work mode is not set to be the other specific work mode, the processing step is moved from Step S8 to Step S10, and the maximum throttle amount is set to be 100%. In other words, the maximum throttle amount is not limited.

On the other hand, when the work mode is set to be the tooth mode, the processing step is moved from Step S7 to Step S11. In Step S11, the maximum throttle amount is limited based on a table illustrated in FIG. 6(*a*), that is, the discharge pressure of the working machine hydraulic pump 7. More specifically, when the discharge pressure is less than or equal to P1 (e.g., 200 kg/cm$^2$), the maximum throttle amount is set to be B1 (78% in this case). When the discharge pressure is P2 (e.g., 250 kg/cm$^2$), the maximum throttle amount is set to be B2 (67% in this case) that is less than B1. When the discharge pressure is P3 (e.g., 300 kg/cm2), the maximum throttle amount is limited to be B3 (57% in this case) that is further less than B2. In addition, as illustrated in a solid line in FIG. 6(*b*), the maximum throttle amount is set by an interpolation computing for linearly changing the maximum throttle amount. Needless to say, numeric values shown in FIG. 6(*a*) are just an example, and an appropriate table is set in accordance with type of vehicle, content of work, and the like.

Here, a processing for reducing the maximum throttle amount in response to increase of the discharge pressure of the working machine hydraulic pump 7 is performed. Therefore, the traction force is further reduced in response to increase of the work load, and accordingly the lift force is increased. Accordingly, workability is further enhanced.

Note that when the above described maximum throttle amount is limited, change of the maximum throttle amount is immediately performed when the conditions are respectively satisfied. However, if the maximum throttle amount is returned to the original 100% after it is limited (e.g., limited to 78% from 100%), especially in switching between forward movement and backward movement, the maximum throttle amount is configured to be changed in a state that the clutch hydraulic pressure is maintained in a constant pressure, and is configured not to be changed in a phase that the hydraulic pressure of the hydraulic clutch varies while the speed change gear of the transmission is shifted.

With the above configuration, the maximum throttle amount is set depending on the engine mode (whether the power mode is selected), the speed change gear (whether the speed change gear is shifted to be the first forward/rearward gear), the work mode (whether the work mode is set to be either the tooth mode or the other specific work mode), and the discharge pressure of the working machine hydraulic pressure pump 7, and the set maximum throttle amount is outputted to the engine controller section of the control unit 10.

In the above described embodiment, the maximum throttle amount is limited when the vehicle velocity is low. Accordingly, even when an operator presses the accelerator pedal down, the engine output is limited. Therefore, it is possible to reduce the traction force and it is possible to increase the lift force by the amount corresponding to the reduced amount of the traction force.

Also, when the work mode is set to be the tooth mode, the maximum throttle amount is controlled depending on the discharge pressure of the working machine hydraulic pump 7. Therefore, it is possible to reduce the traction force appropriately depending on a load and it is accordingly possible to increase the lift force. Furthermore, it is possible to control the lift amount depending on the discharge pressure of the working machine hydraulic pump 7. Therefore, the traction force is not reduced when an operation of the working machine is stopped. On the other hand, the traction force is reduced and the lift force is increased when the working machine is operated. Accordingly, it is possible to perform a processing, which is similar to the balance regulation performed by the conventional operator's accelerator manipulation, by the automatic control.

Furthermore, the control for reducing the traction force is herein performed only when the engine mode is set to be the power mode and the speed change gear is shifted to be the first forward gear or the first rearward gear. Therefore, it is possible to perform effective engine control only when the traction force control is needed.

Other Embodiments

In the above embodiment, the tooth mode is set as the first work mode, and the other specific work mode is set as the second work mode. However, the work modes, respectively, are not limited to these. For example, a work mode, on which a claw(s) is/are mounted to a vehicle instead of the bucket and a timber is hauled and loaded therewith, may be set as the first work mode, and the above described tooth mode may be set as the second work mode. In this case, the maximum throttle amount on the first work mode may be controlled in accordance with a property that is illustrated with a dashed-dotted line in FIG. 6. In a similar way to the above, the maximum throttle amount on the second work mode (tooth mode) may be controlled in accordance with a property that is illustrated in a solid line in FIG. 6.

As described above, according to the present invention, it is possible to achieve an appropriate balance between the traction force and the lift force with a simple control, and thus it is possible to further enhance workability.

The invention claimed is:

1. An engine control device configured to control an engine of a self-propelled working vehicle including a working machine hydraulic pump for driving a working machine, the engine control device comprising:

a vehicle velocity detection section configured and arranged to detect a vehicle velocity;

a pump discharge pressure detection section configured and arranged to detect a discharge pressure of the working machine hydraulic pump driven by an output from the engine; and a traction force control section configured to reduce a traction force, by limiting a maximum throttle amount when the vehicle velocity is less than or equal to a predetermined velocity based on a result detected by the vehicle velocity detection section, the traction force control section being further configured to reduce the traction force by controlling the maximum throttle amount depending on the pump discharge pressure in addition to the vehicle velocity.

2. The engine control device of an self-propelled working vehicle of claim 1, further comprising:

an engine mode determining section configured and arranged to determine whether an engine mode is set to be a power mode for using the engine at high-horsepower giving priority to workability or an economy mode for using the engine at low-horsepower giving priority to reduction of fuel consumption rate, the traction force control section being further configured to reduce the traction force by controlling the maximum throttle amount only when the engine mode is set to be the power mode.

3. The engine control device of an self-propelled working vehicle of claim 2, wherein the traction force control section is configured to reduce the traction force by controlling the maximum throttle amount only when the engine mode is set to be the power mode and a speed change gear of a transmission of the working vehicle is set to be a first forward gear among a plurality of speed change gears.

4. The engine control device of an self-propelled working vehicle of claim 1, further comprising:

a work mode selection section configured and arranged to select one of a plurality of work modes set in advance in accordance with a type of the working machine, the work modes including at least a first work mode and a second work mode, and the traction force control section being configured to reduce the traction force by setting a maximum throttle amount when the first work mode to be lower than a maximum throttle amount when the second work mode is selected.

5. The engine control device of an self-propelled working vehicle of claim 1, further comprising:

a work mode selection section configured to select one of a plurality of working modes set in advance depending on a type of the working machine, the traction force control section being configured to reduce the traction force by controlling the maximum throttle amount only when a specific work mode is selected by the work mode selection section.

6. The engine control device of an self-propelled working vehicle of claim 5, wherein the specific work mode includes at least a first work mode and a second work mode, and the traction force control section is configured to reduce the traction force by setting a maximum throttle amount when the first work mode is selected to be lower than a maximum throttle amount when the second work mode is selected.

* * * * *